United States Patent [19]

Bortfeldt et al.

[11] Patent Number: 5,374,175

[45] Date of Patent: Dec. 20, 1994

[54] TONER FINE RECOVERY SYSTEM

[75] Inventors: Michael J. Bortfeldt, Rochester; John R. Farkas, Webster; Jeffery Q. Hammond, Rochester; Thomas W. O'Connor, Pittsford; Valentin Sukhenko, Rochester; Mit G. Turakhia, Fairport, all of N.Y.

[73] Assignee: Xerox Corporation, Stamford, Conn.

[21] Appl. No.: 734,413

[22] Filed: Jul. 23, 1991

[51] Int. Cl.⁵ ............................................. B29C 47/00
[52] U.S. Cl. ................................. 425/67; 210/411; 264/38; 425/215; 425/308; 425/317
[58] Field of Search ............ 210/251, 411, 412, 512.1; 264/37, 38, 142; 425/67, 215, 217, 289, 308, 310, 311, 317, DIG. 230

[56] References Cited

U.S. PATENT DOCUMENTS

| | | | |
|---|---|---|---|
| 3,146,493 | 9/1964 | Steinle et al. | 425/67 |
| 3,207,818 | 9/1965 | Marshall | 425/67 |
| 3,733,160 | 5/1973 | Neil | 425/217 |
| 4,239,626 | 12/1980 | Vamvakas | 210/333.01 |
| 4,271,018 | 1/1981 | Drori | 210/107 |
| 4,308,142 | 12/1981 | Braukmann et al. | 210/355 |
| 4,385,016 | 5/1983 | Gwinn | 264/37 |
| 4,431,541 | 2/1984 | Lee | 210/412 |
| 4,606,873 | 8/1986 | Biglione et al. | 425/311 |
| 4,632,752 | 12/1986 | Hunke | 425/308 |
| 4,693,815 | 9/1987 | Collins, Jr. | 210/107 |
| 4,787,972 | 11/1988 | Stubblebine | 210/512.1 |
| 4,850,835 | 7/1989 | Rudolph | 264/142 |
| 4,970,043 | 11/1990 | Doan et al. | 264/37 |
| 4,971,694 | 11/1990 | Richter | 210/333.01 |
| 4,978,288 | 11/1990 | Ellwood | 425/DIG. 230 |
| 4,997,566 | 3/1991 | Davis | 210/433.1 |

*Primary Examiner*—Charles S. Bushey
*Attorney, Agent, or Firm*—H. Fleischer; J. E. Beck; R. Zibelli

[57] ABSTRACT

An apparatus in which toner fines are recovered from a recirculating liquid transporting toner pellets cut from extruded toner. The recirculating liquid cleans the pellet cutter and forms a mixture of liquid and toner fines. The recovery unit is positioned between the pellet cutter and a station discharging the pellets. In this way, clean liquid flows into the pellet cutter during each cycle. The recovery unit has a housing defining a chamber having two sections. A sloping screen is located in the chamber covering one of the chamber sections. The mixture of toner fines and liquid is dispensed onto the screen. The liquid passes through the screen and is recirculated. Toner fines collect on the screen. A backwash system washes the toner fines from the screen into the other section of the chamber. The mixture of toner fines and liquid is pumped from the other chamber section into a separator. The toner fines are separated from the liquid and re-used in the extruder. Liquid from the separator is returned to the other chamber section.

9 Claims, 2 Drawing Sheets

TONER FINE RECOVERY SYSTEM

This invention relates generally to a manufacturing process for extruding toner pellets, and more particularly concerns an apparatus for continuously recovering very fine toner beads from water being recirculated during the manufacture process.

Generally, in manufacturing toner pellets, an extruder blends polymer resins to form an extruded resin. The extruded resin is cut into pellets. A liquid conveyor system is used to transport and cool the pellets. At a discharge station, the toner pellets are separated from the liquid and the liquid is recirculated for subsequent re-use. Typically, water as used as the liquid for transporting and cooling the toner pellets. It has been found that very fine toner beads, known in the art as toner fines, remain with the liquid forming a mixture which is detrimental to the manufacturing equipment. Contamination from the toner fines has resulted in equipment failures. For example, toner fines can cause poor heat transfer and plugging of nozzles resulting in low water flow, as well as causing the pellets to fuse to one another. This has required that the liquid be replaced periodically as the concentration of toner fines exceeds an acceptable level. Moreover, the toner fines were discarded resulting in reduced yields and increased costs. Clearly, it is highly desirable to recover the toner fines for subsequent re-use. Removing the toner fines from the liquid increases equipment life and eliminates any requirement to replace the liquid. In addition, the recovered toner fines can be processed for subsequent re-use resulting in increased yields and reduced costs. Various types of filtering systems have hereinbefore been used as illustrated by the following disclosures, which may be relevant to certain aspects of the present invention:

U.S. Pat. No. 4,239,626 Patentee: Vamvakas Issued: Dec. 16, 1980

U.S. Pat. No. 4,271,018 Patentee: Drori Issued: Jun. 2, 1981

U.S. Pat. No. 4,308,142 Patentee: Braukmann et al. Issued: Dec. 29, 1981

U.S. Pat. No. 4,693,815 Patentee: Collins, Jr. Issued: Sep. 15, 1987

U.S. Pat. No. 4,971,694 Patentee: Richter Issued: Nov. 20, 1990

U.S. Pat. No. 4,997,566 Patentee: Davis Issued: Mar. 5, 1991

The relevant portions of the foregoing patents may be briefly summarized as follows:

U.S. Pat. No. 4,239,626 discloses a filter for removing loose particles carried in a liquid stream such as loose particles in a bottle washing machine. An outer tank surrounds an inner rotatable finely perforated drum mounted on an axial shaft running throughout the drum and tank. The shaft is hollow with spaced perforations and a backwash liquid may be passed through the shaft to wash away small paper particles which may stick to the drum after an operation of the filter cycle. The contaminated liquid enters the outer tank near one end and passes along the length of the drum and through the perforated periphery and exits as a clear discharge through a discharge opening.

U.S. Pat. No. 4,271,018 describes a backwashable filtering device having a housing with a rotatably mounted filter therein. A backwash nozzle is fixed to the housing. The filter body is rotated by rotors and gear drives relative to the backwash device so as to clean and unclog the filter body.

U.S. Pat. No. 4,308,142 discloses a backwashable filtering device comprising a housing, a main filter, an inlet for receiving liquid, and an outlet for discharging liquid. A rotatably mounted sprayer is positioned in a cylindrical shaped main filter for receiving liquid. The sprayer discharges the liquid against the inner surface of the filter to backwash and clean the surface.

U.S. Pat. No. 4,693,815 describes a self-cleaning filter which has two filter units. Each filter unit has a housing forming an internal cavity and a rotatably mounted liquid agitator. A flat filter is mounted between the housing and a housing cap. The filter face is exposed to the internal cavity. The housing forms inlet and outlet liquid flow passages for circulating a liquid sample through the cavity around the agitator and into contact with the filter face. The agitator agitates the liquid sample within the cavity and forces a portion of the liquid sample in a washing action across the filter face. The housing cap forms a passage for withdrawing a filtered sample of the liquid sample through the filter. A drive is connected to the agitators of both filter units. The outlet of one filter unit is connected to the inlet of the other filter unit to permit the liquid sample to be pumped through the cavities of the filter units.

U.S. Pat. No. 4,971,694 discloses a double diffuser with backflush pistons that are internally mounted within a pulp treating vertical vessel. The first and second sets of screens are mounted one on top of the other on a supporting arm/conduit wherein a first cylinder is connected at one open end to the conduit and the other end is exposed to pulp within the vessel. A second cylinder is mounted so that it is concentric with the first cylinder. A piston is mounted within each cylinder. Relative movement between the piston and cylinders is effected periodically in order to force liquid from within the cylinders and into conduit and through the screens to provide backflushing of the screens and prevent clogging.

U.S. Pat. No. 4,997,566 describes an inclined static filter for separating solids from liquids and disposes of the solids. Two interconnected channels are positioned at different elevations for carrying the liquid. Two sets of plates are interleaved and angularly disposed between the two channels. The sets of plates are downwardly inclined at different angles. Solids collect along the top edges of the set of plates inclined at the lesser angle. A conveyor at the bottom of the lesser inclined plate members carries the collected solids away.

In accordance with one aspect of the present invention, there is provided an apparatus for manufacturing toner pellets, including means for extruding toner. Means, coupled to the extruding means, cuts the toner being extruded from the extruding means into pellets with toner fines being formed during the cutting of the toner into the pellets. Means are provided for discharging the toner pellets. Means move the liquid in a recirculating path between the cutting means and the discharging means with the liquid transporting the pellets from the cutting means to the discharging means resulting in the liquid having toner fines mixed therein over a portion of the recirculating path. Means, interposed between the cutting means and the discharging means, are provided for recovering toner fines from the liquid.

Pursuant to another aspect of the present invention, there is provided an apparatus for recovering toner fines from a recirculating liquid, including a housing defining a chamber partitioned into two sections. A screen is disposed over one section of the chamber. The screen is pervious to the liquid and non-pervious to the toner fines. Means are provided for dispensing a mixture of liquid and toner fines onto one surface of the screen so that the liquid passes through the screen and the toner fines collect on the one surface of the screen.

BRIEF DESCRIPTION OF THE DRAWINGS

Other aspects of the present will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications and equivalents that may be included within the spirit and scope of the invention as defined by the appended claims.

Figure 1:
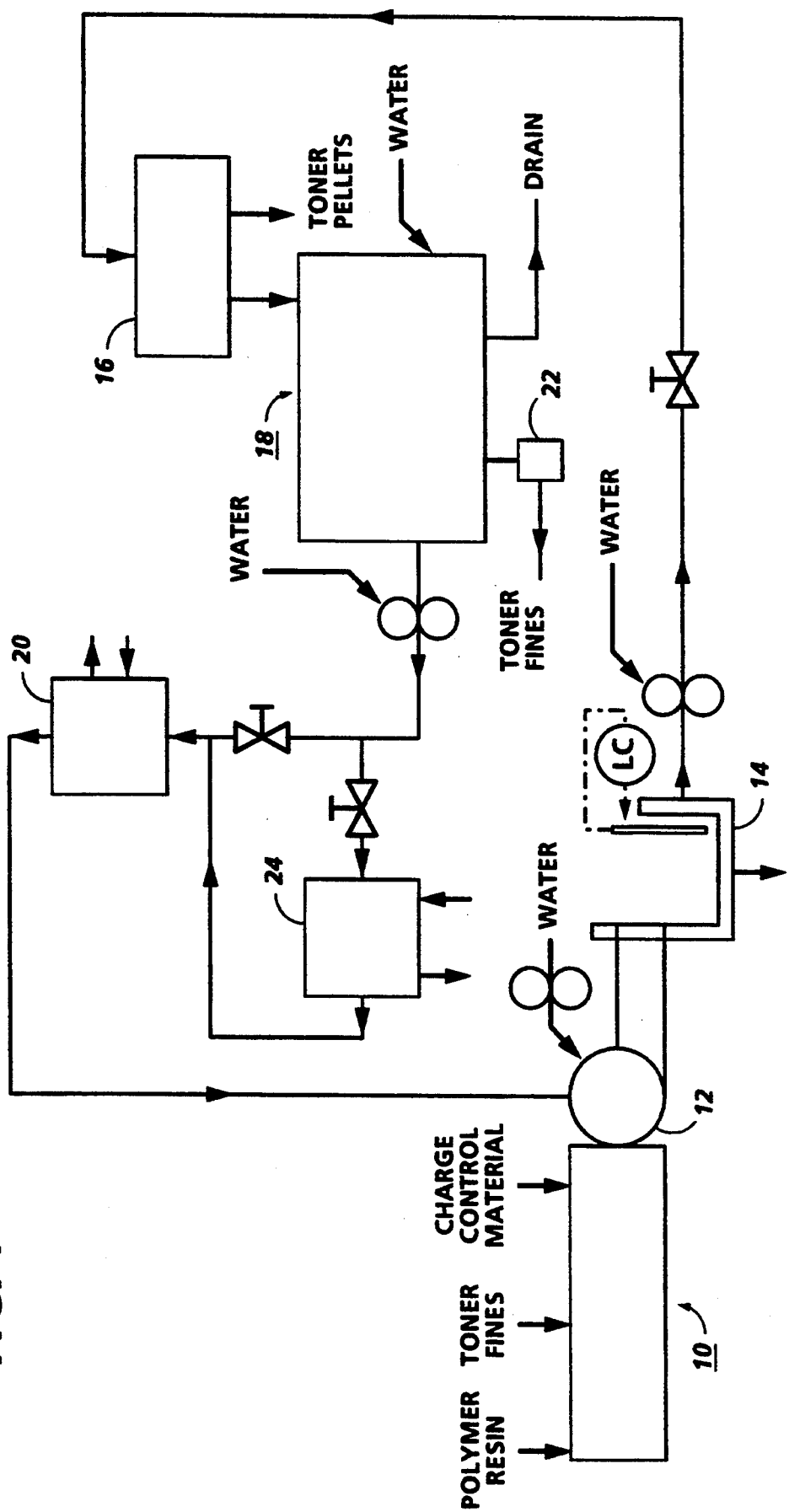
FIG. 1 is a block diagram illustrating a toner pellet manufacturing process that incorporates the features of the present invention therein.

For a general understanding of the toner pellet manufacturing process, reference is made to the drawings. In the drawings, like reference numerals have been used throughout to designate identical elements. FIG. 1 schematically depicts the various steps used in manufacturing toner pellets. Although the toner fine recovery unit of the present invention is particularly well adapted for use in the illustrated toner pellet manufacturing process, it will become evident from the following discussion that it is equally well suited for use in a wide variety of manufacturing processes and is not necessarily limited in its application to the particular embodiment shown herein.

Inasmuch as the art of extruding toner is well known, the various processing stations employed in the FIG. 1 toner pellet manufacturing process will be shown hereinafter schematically, and their operation described briefly with reference thereto.

As shown in FIG. 1, raw polymer resins, reclaimed toner fines and charge control material are fed into the barrel of an extruder, indicated generally by the reference numeral 10. One continuous screw or a pair of screws rotate in the barrel shearing, rubbing and kneading the material. The screw action is augmented by forcing the material through breaker screens. Thereafter, the material advances around a breaker disk. Finally, the material is discharged through a die resulting in an extrusion of toner. A typical die used for this purpose has a series of ¼ inch diameter openings.

Next, the extruded toner advances into a granulator, indicated generally by the reference numeral 12. The granulator has four blades rotating at high speed to cut the extruded toner into toner pellets. A recirculated liquid, e.g. water, is pumped through nozzles of granulator 1 onto the blades. By way of example, the water flow through a pipe having a 3 inch diameter at rate of about 120 gallons/minute. The nozzles spray high pressure water onto the blades. In this way, the blades are maintained substantially toner free. After being cut to size, the flowing water transports the pellets to a holding tank 14. By way of example, the water and pellets flow through a pipe having an 8 inch diameter to holding tank 14. Preferably, holding tank 14 has a 38 gallon capacity. The water and the pellets are pumped from holding tank 14 to separation unit 16. Separation unit 16 has a vibrating screen. The mesh of the screen is selected sufficiently fine to prevent the toner pellets from passing therethrough. Preferably, the screen is made from a 200 micron screen. The pellets are discharged from separation unit 16 for subsequent further processing into toner particles. The water and toner fines pass through the screen of separation unit 16 into the toner fines recovery unit, indicated generally by the reference numeral 18. Toner fines recovery unit 18 separates the incoming water and toner fines in two chambers. One chamber receives and discharges clean water. The other chamber receives and discharges a mixture of toner fines and water. The mixture of toner fines and water is discharged from recovery unit 18 into a separator unit 22. Preferably separator unit 22 is a hydroclone separator that separates the water from the toner fines. Hydroclone separator 22 receives the mixture of toner fines and water. The hydroclone separator is designed to produce centrifugal forces which separate the toner fines from the water. The toner fines are discharged into a storage container and are reused in extruder 10 for toner manufacture. Clean water from separator unit 22 is returned to recovery unit 18 for re-use. The detailed structure of recovery unit 18 will be described hereinafter with reference to FIG. 2.

Clean water is pumped from toner fines recovery unit 18 into heat exchanger 20. The water acts as a coolant to maintain the process temperature at about 115° F. In addition, clean water is pumped from recovery unit 18 to heat exchanger 24. Heat exchanger 24 cools the water. The cooled water from heat exchanger 24 is mixed with the water from recovery unit 18 before entering heat exchanger 20. Water exiting heat exchanger 20 is returned to granulator 12 and the foregoing cycle is repeated.

It is believed that the foregoing description is sufficient for purposes of the present application to illustrate the general operation of an exemplary toner extrusion process incorporating the features of the present invention therein.

Figure 2:
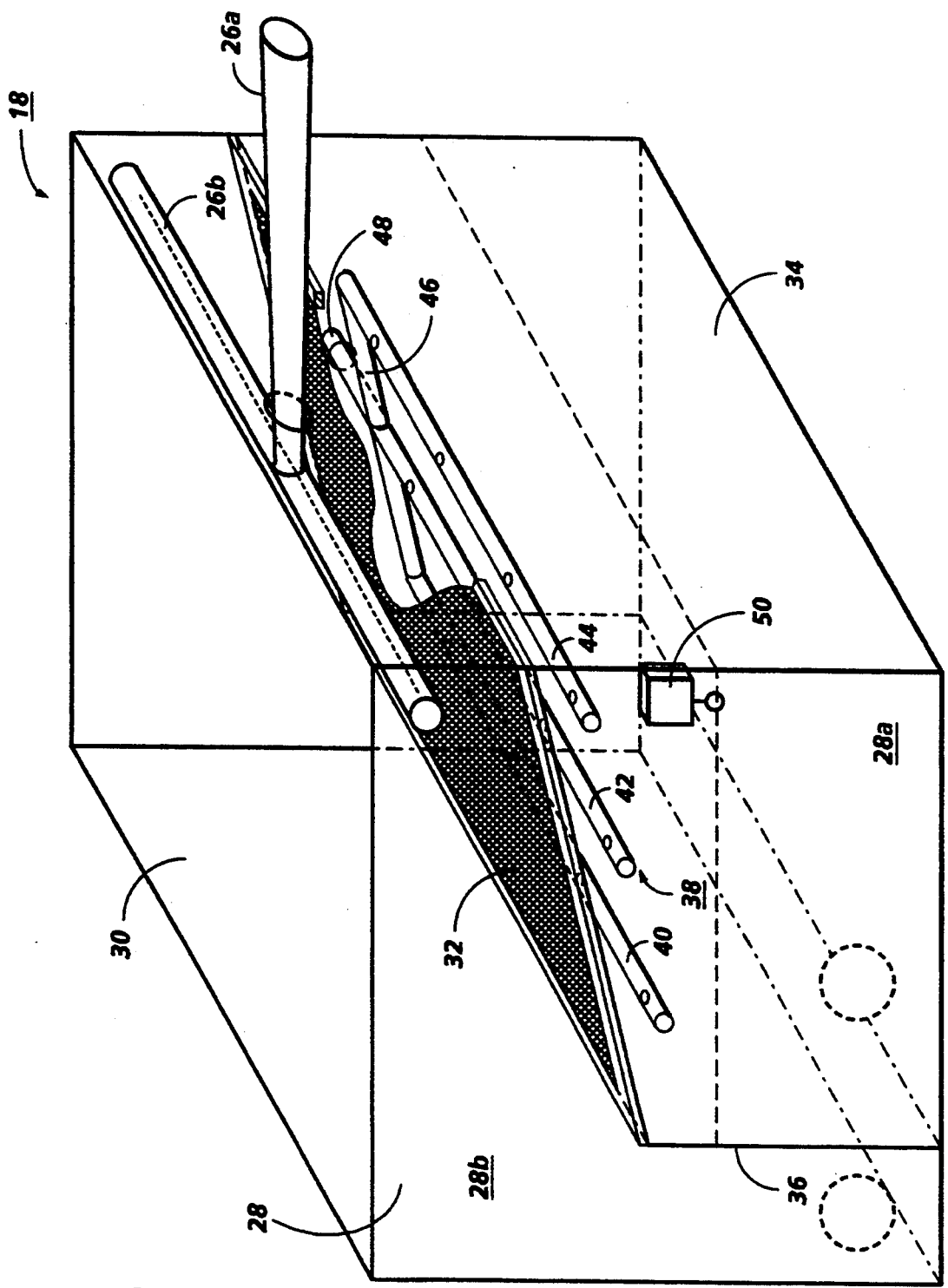
FIG. 2 is a schematic perspective view showing the toner fines removal system used in the FIG. 1 toner pellet manufacturing process.

Referring now to FIG. 2, the detailed structure of toner fines recovery unit 18 is shown thereat. Toner fines recovery unit 18 includes a housing 30 defining a chamber 28. By way of example, housing 30 may be a 360 gallon tank made from stainless steel. As shown, a mixture of water and toner fines flows through an upper sprayer 26 into chamber 28 of housing 30. Preferably, sprayer 26 is "T" shaped. Sprayer 26 is located in the upper portion of chamber 28 of housing 30 and extends thereacross. A screen 32 is located in chamber 30 beneath sprayer 26. Portion 26a of sprayer 26 is a non-perforated tube. Portion 26b of sprayer 26 has a slit extending across screen 32. Water and toner fines flow evenly from the slit in portion 26b of sprayer 26 onto the upper surface of screen 32. Chamber 28 is divided into sections 28a and 28b. Screen 32 extends from wall 34 of housing 30 to an intermediate wall 36 covering section 28a of chamber 28. Screen 32 is oriented at about a 10° angle with respect to the horizontal. The end of screen 32 attached to wall 34 is higher than the end of screen 32 attached to wall 36. The slant of the screen 32 facilitates the sliding of toner fines into section 28b of chamber 28. Screen 32 is made preferably from a pair of screens in juxtaposition with one another. The top screen has 60 micron openings with the bottom screen having 100 micron openings. The size of the openings in the top screen is selected to be pervious to water and non-pervious to toner fines. The bottom screen is used primarily for reinforcement.

A high pressure backwash system, indicated generally by the reference numeral 38, is substantially parallel to screen 32. Backwash system 38 includes three parallel, spaced tubes 40, 42, and 44. Tube 46 extends substantially perpendicular to and connects tubes 40, 42 and 44 to one another. Tubes 40, 42 and 44 each have four equally spaced nozzles therein. In this way, backwash system 38 has twelve nozzles arranged in a three by four matrix array. By way of example, each tube 40, 42 and 44 is made from a copper pipe having a diameter of about ¾ inch and a length of about 3½ feet. Tube 46 may be a pipe having a diameter of about 1¼ inches and a length of about 2 feet. A tube 48 is connected to tube 46 at about the mid-point thereof. Tube 48 furnishes pressurized water to tube 46, and, in turn, tubes 40, 42, and 44. By way of example, tube 48 may be made from a pipe having a diameter of about 1¼ inches. A pump (not shown) is connected tube 48 and pumps water at a pressure of 180 pounds/inch$^2$ and at a rate of 15 gallons/minute distributed through tubes 40, 42, 44, 46, and 48. Backwash system 38 is mounted so that the nozzles are above the tank water level in section 28a of chamber 28. This permits cleaning of screen 32 at maximum water pressure. A control system may be coupled to backwash system 38 to continuously clean screen 32 or to be actuated at selected time intervals. In this way, backwash system 38 sprays water upwardly through screen 32 to wash the toner fines from screen 32 into section 28b of chamber 28.

A switch 50 regulates the water level of section 28a. When the water level exceeds a preselected level, switch 50 is actuated. Actuation of switch 50 opens a valve (not shown) and energizes a pump (not shown). Water is discharged from section 28a of chamber 28 to heat exchangers 20 and 24. The level in section 28b is also controlled by a manually operated valve (not shown). The mixture of water and toner fines in section 28b flows from section 28b into hydroclone 22 (FIG. 1). The hydroclone separates the toner fines from the water. The toner fines are returned to extruder 10 (FIG. 1) and the water returns to chamber 28 of housing 30.

In recapitulation, the present system extrudes toner and cuts the extruded toner into pellets. The toner pellets are transported by water to a discharge area where the toner pellets are separated from the water and toner fines. The mixture of water and toner fines is advanced to the toner fine recovery unit which separates the toner fines from the water and recirculates the water for reuse. The recovered toner fines are returned to the extruder. It is thus clear that the recovery unit removes toner fines continuously from the recirculating water with no loss in productivity or down time.

It is, therefore, evident that there has been provided, in accordance with the present invention a toner fines recovery unit that fully satisfies the aims and advantages hereinbefore set forth. While this invention has been described in conjunction with one embodiment thereof, it is evident that many alternatives, modifications and variations will be apparent to those skilled in the art. Accordingly, it is intended to embrace all such alternatives, modifications and variations as fall within the spirit and broad scope of the appended claims.

We claim:

1. An apparatus for manufacturing toner pellets, including:
   means for extruding toner;
   means, coupled to said extruding means, for cutting the toner being extruded from said extruding means into pellets with toner fines being formed during the cutting of the toner into the pellets;
   means for discharging the toner pellets;
   means for moving a liquid in a recirculating path between said cutting means and said discharging means with the liquid transporting the pellets from said cutting means to said discharging means resulting in the liquid having toner fines mixed therein over a portion of the recirculating path; and
   means, disposed downstream of said cutting means and said discharging means in the path of liquid movement, for recovering toner fines from the liquid.

2. An apparatus according to claim 1, wherein said recovery means includes:
   a housing defining a chamber partitioned into two sections;
   a screen disposed over one section of the chamber, said screen being pervious to the liquid and non-pervious to the toner fines; and
   means for dispensing a mixture of liquid and toner fines onto one surface of said screen so that the liquid passes through the screen and the toner fines collect on the one surface of said screen.

3. An apparatus according to claim 2, wherein said removing means includes means for generating a flow of liquid onto the other surface of said screen to move the toner fines collected on the one surface of said screen into the other section of the chamber of said housing to form a mixture of toner fines and liquid in the other section of the chamber of said housing.

4. An apparatus according to claim 3, further including:
   means, coupled to said recovering means, for receiving the mixture of toner fines and liquid from the other section of the chamber and separating the liquid from the toner fines; and
   means for returning the liquid from said receiving and separating means to the other section of the chamber of said housing.

5. An apparatus according to claim 4, wherein said dispensing means includes a tube having a slot therein extending across said screen, said tube receiving a mixture of liquid and toner fines for dispensing from the slot therein onto the one surface of said screen.

6. An apparatus according to claim 5, wherein said generating means includes
   a plurality of spaced tubes having liquid ejecting nozzles therein; and
   a common tube connecting said plurality of tubes to one another to form an array nozzles for spraying pressurized liquid onto the other surface of said screen to remove the toner fines therefrom.

7. An apparatus according to claim 6, wherein said screen is mounted so as to be sloping downwardly from one marginal region of the one section opposed from the other section to the other marginal region adjacent to the other section.

8. An apparatus according to claim 7, wherein said receiving and separating means includes a centrifugal separator.

9. An apparatus according to claim 8, wherein the liquid being recirculated is water.

* * * * *